Jan. 28, 1964
H. ARAK
3,119,774
UNDERGRAVEL FILTER
Filed June 27, 1960
2 Sheets-Sheet 1
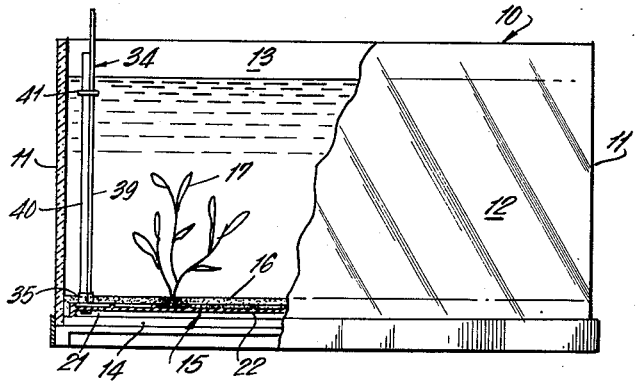
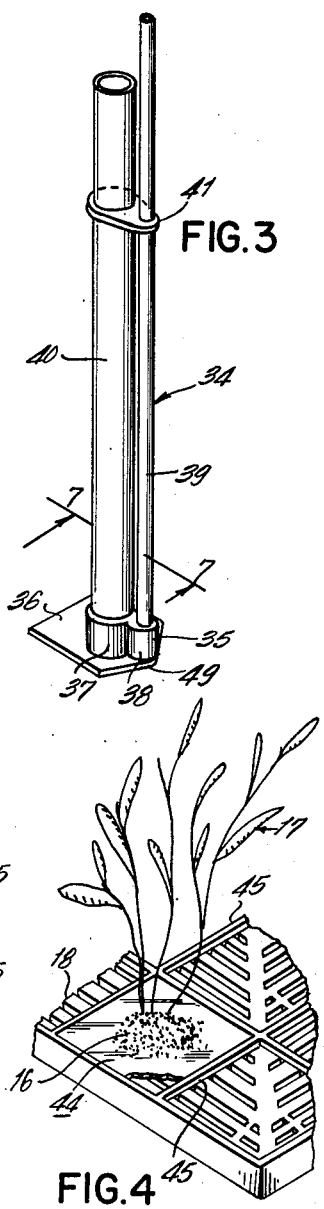
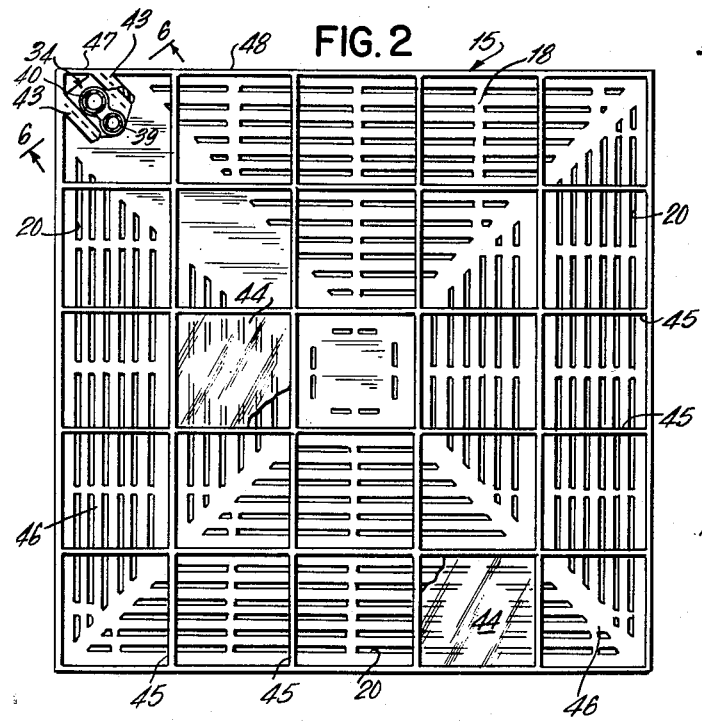
INVENTOR.
HENRY ARAK
BY
ATTORNEY Jan. 28, 1964   H. ARAK   3,119,774
UNDERGRAVEL FILTER
Filed June 27, 1960   2 Sheets-Sheet 2

INVENTOR.
HENRY ARAK
BY
ATTORNEY

United States Patent Office 3,119,774
Patented Jan. 28, 1964

3,119,774
UNDERGRAVEL FILTER
Henry Arak, Brooklyn, N.Y., assignor to Aquariums Incorporated, Maywood, N.J., a corporation of Delaware
Filed June 27, 1960, Ser. No. 38,906
2 Claims. (Cl. 210—169)

This invention relates to filtering devices for aquariums, and more particularly to the general type of filtering device commonly referred to as an undergravel filter.

Undergravel filtration devices are coming into increasing use by aquarium hobbyists. A filter of this type generally comprises a planar supporting member, or foraminous panel substantially co-extensive with the aquarium bottom wall or floor and supported in spaced relation thereto so as to define a water chamber therebetween. The planar member supports a bed of aquarium gravel and is systematically apertured. The planar member is thus pervious to water. However, the openings of foramens of the supporting member are such that the passage of particles of aquarium gravel therethrough is prevented while the passage of water is unimpeded. A device of this type is also provided with a suction means in communication with the chamber beneath the supporting panel which serves to draw the water from the chamber and after aeration and conditioning returns it to the aquarium tank directly or through the interposition of additional filtration or conditioning means. In any event, the aquarium water is constantly being drawn through the bed of aquarium gravel which serves as a filtration means and in some respects otherwise treats or conditions the aquarium water. Thence, the water is drawn through the water pervious supporting member and passes into the chamber to be withdrawn therefrom under the influence of the suction means. In many filter arrangements of this type inadequate provision has been made for providing an efficient form of flow pattern and distribution in the water chamber to accomplish the desired purposes of the filter. It has also been found that in many forms of filters of this general type the plant life within the aquarium is adversely affected.

It is therefore an object of this invention to provide a filtration arrangement of the general type indicated which acts in an effective and efficient manner and which may be economically produced on a large scale.

It is an additional object of this invention to provide a filtration arrangement wherein an improved flow pattern and distribution is provided.

It is another object of this invention to provide a filtration device wherein means are provided for safeguarding plant life and preventing any adverse effect upon the life and growth of such aquarium life.

Other and further objects of this invention will become apparent from the description thereof contained in the annexed specification, or will otherwise become obvious. It will be understood that the invention here disclosed may be employed for other purposes to which the structure and arrangement are adapted.

In the accompanying drawings:

FIGURE 1 is an elevational view of an aquarium, partly broken away shown equipment with a filter device in accordance with the present invention;

FIGURE 2 is a top plan view of an aquarium device in accordance with the present invention;

FIGURE 3 is a perspective view of the airlift assembly portion of the device shown on an enlarged scale;

FIGURE 4 is a fragmentary perspective view of one corner of the device showing a cover plate and plant in position;

FIGURE 5 is a perspective view of a cover plate;

Figure 6:
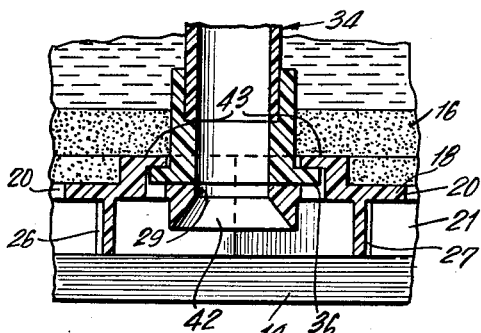
FIGURE 6 is a cross-sectional view of FIGURE 2 taken along line 6—6 thereof, partly broken away and shown in position in the aquarium tank, all on an enlarged scale.

Referring now more particularly to the drawings, FIGURE 1 illustrates an aquarium tank designated generally by the numeral 10. Said tank is comprised of side walls 11, front and rear walls 12 and 13 respectively and bottom wall 14. The filter device comprising the present invention is designated generally by the numeral 15 and is shown set into the bottom of the aquarium in supporting contact with the bottom wall 14 thereof. The filter device 15 supports a gravel aquarium bed 16, which, in turn, may support various forms of aquarium plant life, such as is designated by the numeral 17.

Figure 8:
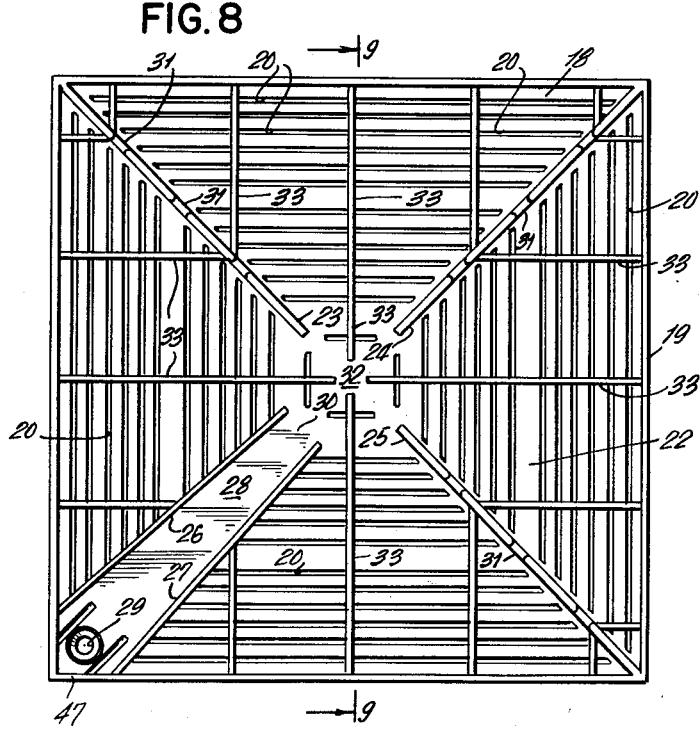
FIGURE 8 is a bottom plan view of the device.
Figure 9:
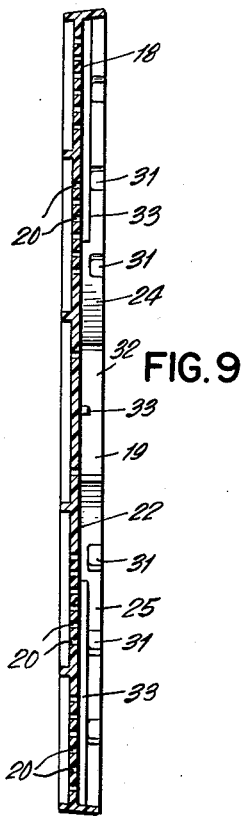
FIGURE 9 is a cross-section of the device taken along line 9—9 thereof shown on an enlarged scale.

The filter device is more particularly illustrated in FIG. 2, 8 and 9. As may be seen from said figures, the filter device 15 is comprised of a flat plate or supporting panel 18 and a depending peripheral wall or skirt 19 which serves to enclose and support the supporting panel 18 in spaced relation with the bottom wall of the aquarium. A chamber 21 is thus defined between the bottom wall of the aquarium and the undersurface of the supporting panel 18. The supporting panel 18 is further provided with a plurality of apertures advantageously in the form of slits 20 which permit the free downward movement of water through the gravel bed and into said chamber.

The undersurface 22 of the supporting panel 18 is provided with a plurality of partitions 23, 24, 25, 26 and 27 which radiate from the center of the panel 18 as a point or origin. One pair of said partitions, namely 26 and 27, are relatively closely spaced to define a passageway or channel 28. These partitions diverge as they approach the corner to which they are directed and an aperture 29 for an airlift assembly extending through the panel 18 is disposed within channel adjacent a cornor defined by depending skirt 19. It will be noted that the panel 18 is imperforate in the area defined by partitions 26 and 27 and overlying the channel 28. It will also be noted that although the end of the channel adjacent aperture 29 is enclosed, the end of said channel adjacent the center of the plate is open and unobstructed, as indicated at 30. Furthermore, it will be noted that notches 31 are provided at spaced intervals along the extent of partitions 23, 24 and 25, the partitions 26 and 27 forming side walls for and defining channel 28 are uninterrupted. The partitions terminate short of the center point of the panel and advantageously extend into the panel corners. By reason of this arrangement, the central area 32 of the panel forms a point of convergence for the aquarium water within chamber 21 from whence the water is drawn into channel 28 and the airlift assembly as will more clearly appear hereafter. The partitions are advantageously coextensive with depending peripheral skirt 19 and consequently rest upon the aquarium bottom when the device is in position within an aquarium tank thereby serving to support the panel under the load of aquarium gravel. The undersurface of panel 18 is further provided with a series of shallow ribs 33 which extend transversely of the slits 20 and contribute to the rigidity of the panel structure. The arrangement of the partitions is such that a flow pattern is set up in the space defined by the chamber wherein the flow of aquarium water is directed toward the central region of the panel before passing into the channel and air lift arrangement. Furthermore, the arrangement of ribs 33 contributes to establishing a degree of turbulence in the chamber which is particularly desirable for conditioning the aquarium water and for dislodging or carrying away particles of matter. It will be noted that the number of slits 20 are reduced in the central region 32 of the panel in order to facilitate the flow between the free or terminal ends of the partitions.

Figure 7:
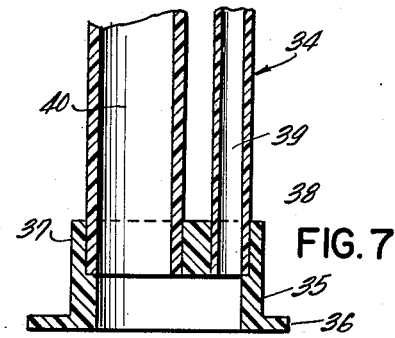
FIGURE 7 is a cross-sectional view of FIGURE 3 taken along line 7—7 thereof partly broken away and shown on an enlarged scale.

As heretofore indicated, aperture 29 formed in the panel wall overlying the channel 28 is provided for operation of airlift assembly. The airlift assembly is more particularly illustrated in FIGURES 3, 6 and 7 and designated generally by the numeral 34. Said assembly 34 comprises a base member 35 provided with a planar footing 36 and a pair of hollow cylindrical socket members 37 and 38 extending upwardly therefrom. An air supply tube 39 is disposed within socket 38 and an air and water tube 40 is disposed within socket 40. The upper portions of the tubes are held in aligned relation by means of collar 41. Referring again to aperture 29 in panel 18, it will be noted that said aperture is provided with a funnel-shaped annular lip 42 depending from the undersurface of the panel, as may be more particularly seen in FIGURE 6. On the upper surface of panel 18 said aperture 29 is flanked by inwardly directed complementary flanges 43 which define a trackway for the reception of the outwardly extending planar side edges of footing 36. It will be apparent that the entire air lift assembly may thus be slid into and out of position on the panel as desired for assembly, disassembly or cleaning. It will also be noted that the corner 47 of the peripheral upwardly directed rib 48 forms a limit stop for the footing 36.

In operation, the filter device 15 is disposed within an aquarium on the bottom wall thereof and a suitable bed of aquarium gravel is superposed thereon. The tank is filled with water and an air supply tube connected to a source of compressed air, not shown, is connected to the free end of air tube 39. The operation of the airlift assembly is conventional and the air bubbles passing from the lower end of air tube 39 into the adjacent end of the air and water tube cause water to rise within the latter tube thereby establishing a suction for the water in chamber 21. Consequently, a suction is also established for drawing water from the aquarium through the gravel bed and slotted panel. The aquarium water is thus continuously purified, filtered, aerated and otherwise conditioned as it is constantly recirculated. As indicated, the water is drawn from the aquarium tank proper through the gravel bed which also acts as a filter, through the slotted panel into the chamber 21. Thence, the water is drawn to the central region 32 of the panel and into channel 28 which leads to aperture 29. The water then passes into the air and water tube 40 and is discharged back into the tank proper from the free upper end of said tube. In the course of this circulatory movement, this water is filtered, aerated, purified and otherwise conditioned.

It has been found in connection with undergravel aquarium filters of this general type, that plant life within the aquarium is adversely affected. It has been found that plant growth is retarded and plant life generally shortened. The reason for this adverse effect upon plant lift is not clear. However, it has been discovered that by preventing the circulation of the aquarium water in the region immediately below the plant roots and the immediately surrounding area, this deleterious effect upon plant lift is eliminated and normal plant growth is restored. It appears that by closing off the suction effect and water stream through the gravel bed at the root region, normal plant propogation is again accomplished while the general benefits of an undergravel type aquarium filter are retained. In order to accomplish this restoration of normal plant growth, an imperforate cover plate is interposed between the aquarium gravel and the slotted panel in the region underlying the location of the aquarium plant to be protected. The cover plate overlies the panel slots and thus blocks off the suction induced circulation and otherwise prevents deterioration of plant life. The upper surface of panel 18 is provided with an upwardly projecting gridwork of ribbing 45 which subdivides the upper surface of said panel into a plurality of shallow compartments defined by said ribbing. The compartments are of uniform dimensions and the height of the ribbing is sufficient to locate a cover plate and retain it in position against displacement forces. By providing a gridwork defining uniform compartments, a limited number of cover plates may be provided by the manufacturer with each filter device. These cover plates may then be located in any of the compartments corresponding to the desired plant location. Since only a limited number of cover plates are used, the general filtration efficiency of the device is not affected while plants are permitted to flourish. It is preferred to dispose the cover plates in position prior to the deposition of the gravel over the supporting panel of the filtration device. However, the arrangement of the gridwork makes it possible to effectively locate and retain cover plates in position by inserting under the desired area of an existing gravel bed. The cover plate being advantageously formed as a thin planar, relatively stiff member, permits it to be forced into a compartment by insertion through the bed of gravel material. Thus, the cover plates may be removed and relocated in accordance with desired plant locations without materially disturbing the aquarium arrangement or gravel bed. It is preferred to form the aquarium filter of molded thermoplastic material and the cover plates may be advantageously formed of a similar material or cut from sheets thereof. The material may be transparent. In the form of the invention illustrated, a uniform pattern of square compartments is defined by the grid work. This leads to considerable economies in manufacture and interchangeability. Different pattern arrangements for the gridwork may be utilized, such as rectangular patterns, for example. A considerable advantage is derived from the use of a uniform pattern in that only a limited number of cover plates are required and these may be disposed in any desired location on the panel.

I have here shown and described a preferred embodiment of my invention. It will be apparent, however, that this invention is not limited to this embodiment, and that many changes, additions and modifications can be made in connection herewith without departing from the spirit and scope of the invention as herein disclosed and hereinafter claimed.

I claim:

1. An aquarium water treatment device comprising a support member having a planar base provided with depending portions for mounting the base in spaced relation above the bottom of the aquarium, a gridwork of raised ribs disposed on the upper surface of said base to define a plurality of shallow compartments adapted to hold filter gravel, each compartment having a floor defined by the portion of said base which is included in the compartment, said floors having water pervious openings defined therein to provide for the circulation of water through the gravel in the respective compartment, and removable means to prevent water circulation through at least one of said compartments so as to convert said one compartment for plant-life water treatment out of the water circulation path, said removable means cooperating with the opposing portions of said one compartment to block off all suction-induced circulation therethrough.

2. An aquarium water treatment device as in claim 1, said means comprising a removable water impervious plate overlying in water-tight relation the openings in said one compartment for supporting water treatment plant life therein, said plate having a contact with the floor of said one compartment which prevents all circulation of water through said last mentioned floor.

References Cited in the file of this patent
UNITED STATES PATENTS

| | | |
|---|---|---|
| 357,698 | Burrough | Feb. 15, 1887 |
| 2,802,339 | Fogerty | Aug. 13, 1957 |
| 2,935,199 | Willinger | May 3, 1960 |
| 3,006,476 | Halpert | Oct. 31, 1961 |